US012116814B2

(12) United States Patent
Li

(10) Patent No.: US 12,116,814 B2
(45) Date of Patent: Oct. 15, 2024

(54) ANTI-BOUNCE SHOWER DOOR

(71) Applicant: Guangdong Gres Sanitary Ware Co., Ltd, Foshan (CN)

(72) Inventor: Guochao Li, Foshan (CN)

(73) Assignee: GUANGDONG GRES SANITARY WARE CO., LTD, Foshan (CN)

(*) Notice: Subject to any disclaimer, the term of this patent is extended or adjusted under 35 U.S.C. 154(b) by 0 days.

(21) Appl. No.: 18/453,687

(22) Filed: Aug. 22, 2023

(65) Prior Publication Data

US 2024/0068287 A1 Feb. 29, 2024

(30) Foreign Application Priority Data

Aug. 24, 2022 (CN) ......................... 202222238468.7
May 31, 2023 (CN) ......................... 202321378467.0

(51) Int. Cl.
*E05D 15/06* (2006.01)
*A47K 3/34* (2006.01)
*E05F 5/00* (2017.01)

(52) U.S. Cl.
CPC .............. *E05D 15/063* (2013.01); *A47K 3/34* (2013.01); *E05F 5/003* (2013.01); *E05Y 2900/114* (2013.01)

(58) Field of Classification Search
CPC . E05D 15/063; A47K 3/34; E05F 5/02; E05F 5/003; E05F 1/16; E05F 3/00; E05F 3/02; E05F 3/10
See application file for complete search history.

(56) References Cited

U.S. PATENT DOCUMENTS 4,872,287 A * 10/1989 Block ..................... E05D 13/04 16/87 R
6,052,867 A * 4/2000 Haab ..................... E05D 15/063 16/99
6,438,795 B1 * 8/2002 Haab ....................... E05F 5/003 16/86 B
6,516,575 B2 * 2/2003 Haab ....................... E05D 13/04 52/64
8,307,497 B2 * 11/2012 Chang ..................... E05F 5/003 16/49
8,402,606 B1 * 3/2013 Tsai ........................ E05F 5/003 16/49
8,915,019 B2 * 12/2014 Schachter ............... E05F 5/003 49/425

(Continued)

*Primary Examiner* — Justin B Rephann
(74) *Attorney, Agent, or Firm* — Gottleb, Rackman & Reisman, PC

(57) ABSTRACT

An anti-bounce shower door is disclosed, including an upper rail and a sliding door. The sliding door is provided with a roller, and the roller is slidably connected with the upper rail. The upper rail is hollow, an upper side of the upper rail is provided with a sliding groove, the sliding groove extends along a length direction of the upper rail. The roller is provided with an anti-bounce hook, the anti-bounce hook extends into the sliding groove, and the anti-bounce hook abuts against at least a part of the sliding groove. The disclosure has the beneficial effects as follows. According to the disclosure, the sliding groove is arranged in the upper rail, and the anti-bounce hook is arranged on the roller, so that by extending the anti-bounce hook into the sliding groove to abut against a part of a top wall of the sliding groove, an anti-bounce effect can be achieved.

9 Claims, 5 Drawing Sheets

(56) References Cited

U.S. PATENT DOCUMENTS

| | | | | |
|---|---|---|---|---|
| 9,027,283 | B2 * | 5/2015 | Beyerle | E05F 3/00 49/425 |
| 10,358,856 | B2 * | 7/2019 | Tomlinson | E05F 3/10 |
| 10,455,989 | B2 * | 10/2019 | Wei | E05D 15/063 |
| 10,669,763 | B2 * | 6/2020 | Torrabias Cantal | F16F 9/06 |
| 10,724,285 | B2 * | 7/2020 | Dodge | E05F 1/16 |
| 10,865,597 | B2 * | 12/2020 | Chen | F16F 9/516 |
| 10,961,756 | B2 * | 3/2021 | Cano | A47K 3/34 |
| 11,920,401 | B2 * | 3/2024 | Shaaban | E05F 1/16 |
| 2011/0167588 | A1 * | 7/2011 | Chang | E05F 5/003 16/71 |
| 2013/0333292 | A1 * | 12/2013 | Beyerle | E05F 5/003 49/414 |
| 2014/0173990 | A1 * | 6/2014 | Schachter | E05F 5/003 49/404 |
| 2017/0204646 | A1 * | 7/2017 | Tomlinson | E05F 3/10 |
| 2017/0254130 | A1 * | 9/2017 | Cano | A47K 3/34 |
| 2018/0184853 | A1 * | 7/2018 | Wei | A47K 3/286 |
| 2022/0349231 | A1 * | 11/2022 | Shaaban | E05D 15/0652 |

* cited by examiner

ANTI-BOUNCE SHOWER DOOR

CROSS-REFERENCE TO RELATED APPLICATIONS

This application is based on and claims the benefit of priority from Chinese Patent Application No. 2023213784670 filed on 31 May 2023 and Chinese Patent Application No. 2022222384687 filed on 24 Aug. 2022, the entireties of these applications are incorporated by reference herein.

TECHNICAL FIELD

The disclosure relates to the field of bathroom accessories, and is particularly an anti-bounce shower door.

BACKGROUND

Shower room is a bathroom facility for people to bathe, which can avoid splashing during showering and realize the dry and wet separation, so that the bathroom is tidier. Traditional shower rooms mainly have two types of doors according to their opening ways, including sliding door and swinging door. Among them, the sliding door is more widely used. There are many ways to implement the sliding movement of the glass door in the shower room. One way is to mount rollers on a movable door, then mount a slide rail in the shower room, and make the rollers abut against the slide rail to slide back and forth, so as to realize the sliding of the glass door. Meanwhile, in order to avoid the sliding door from being separated from the slide rail during moving to cause an accident, an anti-bounce member may be arranged under the sliding door close to the slide rail, and the anti-bounce member is used to abut against a bottom of the slide rail, thus avoiding the sliding door from bouncing. The use of the anti-bounce structure above may overcome the accidental bounce of the sliding door in the shower room, but the anti-bounce member will be exposed, which not only affects the aesthetics, but also makes the mounting troublesome. During mounting, the sliding door needs to be mounted on the slide rail first, and then the anti-bounce member is fixed on the sliding door. Meanwhile, corresponding mounting holes need to be drilled in the glass door, which is inconvenient to use.

SUMMARY

The disclosure is to provide an anti-bounce shower door, so as to solve one or more technical problems in the existing technology, and at least to provide a beneficial selection or creation condition.

The solution used in the disclosure to solve the technical problems is as follows. An anti-bounce shower door comprises an upper rail and a sliding door, the sliding door is provided with a roller, and the roller is slidably connected with the upper rail, wherein: the upper rail is hollow, an upper side of the upper rail is provided with a sliding groove, the sliding groove extends along a length direction of the upper rail, the roller is provided with an anti-bounce hook, the anti-bounce hook extends into the sliding groove, and the anti-bounce hook abuts against at least a part of the sliding groove.

The disclosure has the beneficial effects as follows. According to the disclosure, the sliding groove is arranged in the upper rail, and the anti-bounce hook is arranged on the roller, so that by extending the anti-bounce hook into the sliding groove to abut against a part of a top wall of the sliding groove, an anti-bounce effect can be achieved.

As a further improvement of the technical solution above, the sliding groove is provided with a notch, and an outer diameter of the notch is larger than a width of a groove opening of the sliding groove; and a cross section of the anti-bounce hook is T-shaped, and a maximum outer diameter of the anti-bounce hook is larger than the width of the groove opening of the sliding groove and smaller than the outer diameter of the notch. According to the disclosure, the notch is arranged in the sliding groove, and then the T-shaped anti-bounce hook is used to abut against a top wall of the sliding groove, so as to achieve an anti-bounce effect.

As a further improvement of the technical solution above, an outer diameter of the anti-bounce hook is smaller than a groove width of the sliding groove, an anti-bounce member is movably arranged in the upper rail, an outer diameter of the anti-bounce member is larger than the groove width of the sliding groove, and the anti-bounce hook is detachably connected with the anti-bounce member. According to the disclosure, by hiding the anti-bounce member in the upper rail, the anti-bounce structure cannot be seen from the outside, which simplifies mounting of the product. Moreover, because the sliding groove may have a constant groove width, processing of the upper rail is more convenient.

As a further improvement of the technical solution above, one side of the upper rail is provided with a buffer, the buffer comprises a clamping hook, and the clamping hook corresponds to the anti-bounce hook. One side of the upper rail is provided with the buffer, and the anti-bounce hook is directly used to be hooked with the buffer, so as to realize buffering and deceleration of the sliding door at an end portion, and play a better anti-bounce role.

As a further improvement of the technical solution above, the buffer is detachably connected with the upper rail, the buffer comprises a shell, and the shell abuts against an inner wall of the upper rail. By directly mounting the buffer into a cavity of the upper rail, the mounting can be easier.

As a further improvement of the technical solution above, an outer end of the shell is provided with an end head, the end head is provided with a dovetail groove, and an upper rail mounting seat is further comprised, the upper rail mounting seat comprises a mounting hole and an inlay block, and the inlay block is connected with the dovetail groove. By the cooperation between the upper rail mounting seat and the end head, mounting efficiency of the upper rail can be improved, and the upper rail can be directly fixed on a wall body.

As a further improvement of the technical solution above, the upper rail is a stainless steel circular tube.

As a further improvement of the technical solution above, there are two sets of rollers and two notches, and a spacing between the two sets of rollers is matched with a spacing between the two notches. The two sets of rollers can ensure that the sliding door slides more smoothly.

As a further improvement of the technical solution above, the roller comprises a base frame, the base frame is provided with two wheels, and the wheels are rotatably connected with the base frame; and the anti-bounce hook is located between the two wheels. The anti-bounce hook is arranged between the two wheels, so that the two wheels are used to play a role of shielding the anti-bounce hook, thus having better concealment.

As a further improvement of the technical solution above, each of the wheels comprises an inclined end surface, the inclined end surfaces of the two wheels form a V-shaped wheel surface, and the V-shaped wheel surface abuts against the upper rail. The V-shaped wheel surface can increase a contact area, thus ensuring the smoothness of sliding.

As a further improvement of the technical solution above, the anti-bounce shower door further comprises a glass mounting assembly, wherein the glass mounting assembly is fixedly connected with the base frame through a bolt.

As a further improvement of the technical solution above, the glass mounting assembly comprises a back plate and a fixing plate, the back plate is provided with a mounting block, an adjusting cavity is arranged in the mounting block, and one side surface of the adjusting cavity is provided with a clamping tooth; the fixing plate is provided with a mounting column, a mounting hole is arranged in the mounting column, a center line of the mounting hole does not overlap with a center line of the mounting column, and the bolt passes through the mounting hole and then is connected with the base frame; and an outer surface of the mounting column is provided with a second clamping tooth, and the second clamping tooth and the clamping tooth abut against each other. By means of the glass mounting assembly, a mounting height of the sliding door can be adjusted.

As a further improvement of the technical solution above, a bottom portion of the anti-bounce hook is covered with an anti-collision rubber block. The use of the anti-collision rubber block can reduce a collision sound between the anti-bounce hook and the upper rail.

BRIEF DESCRIPTION OF THE DRAWINGS

In order to explain technical solutions in embodiments of the disclosure more clearly, the drawings needing to be used in description of the embodiments are briefly described hereinafter. Obviously, the described drawings are related to only some but not all of the embodiments of the disclosure, and those of ordinary skill in the art may also obtain other design schemes and drawings according to these drawings without going through any creative work.

DETAILED DESCRIPTION

Figure 1:
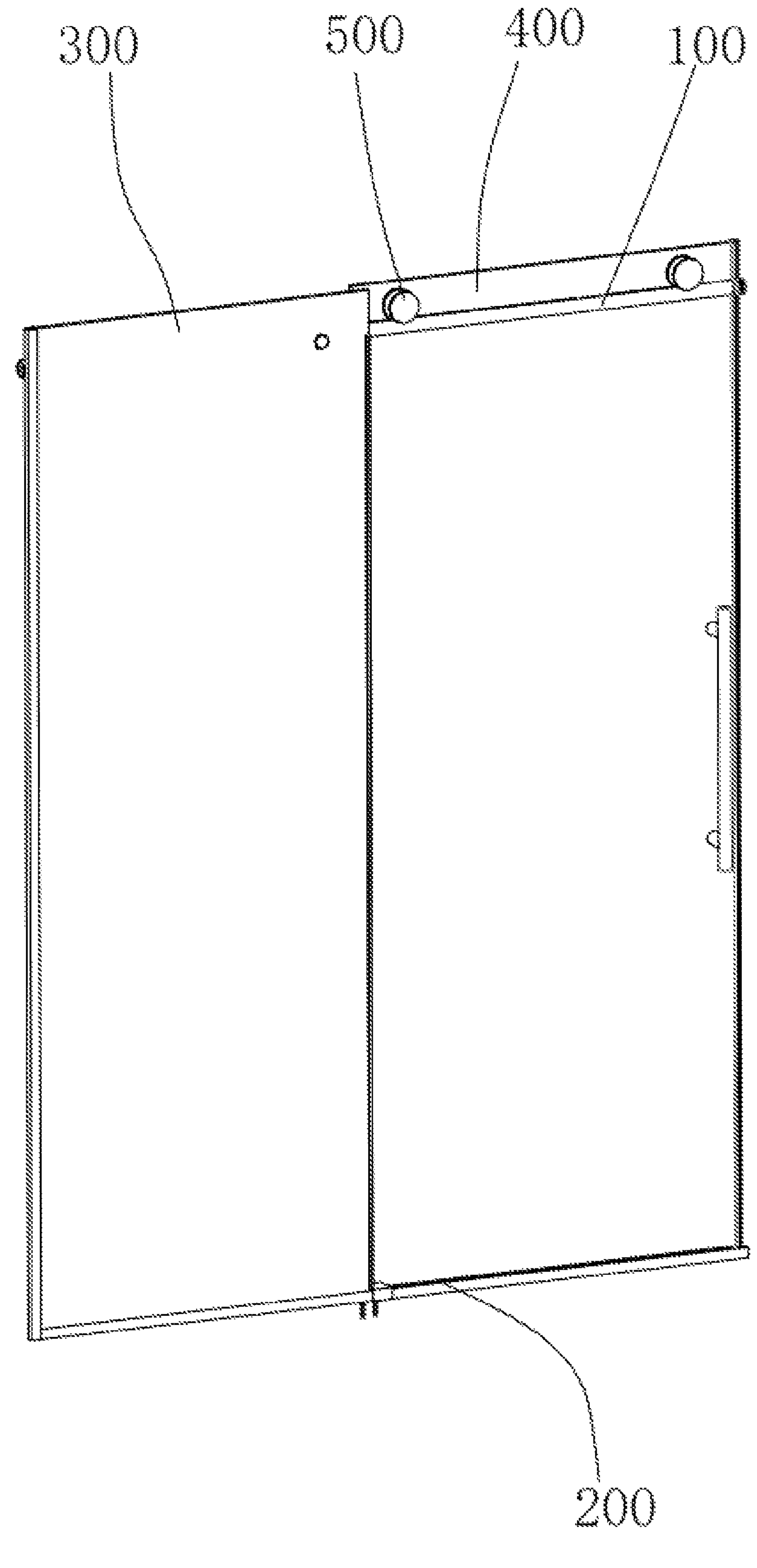
FIG. 1 is a schematic diagram of an overall structure in First Embodiment of the disclosure.

The concept, the specific structure and the generated technical effect of the disclosure are clearly and completely described hereinafter with reference to the embodiments and the drawings to fully understand the objects, the features and the effects of the disclosure. Obviously, the described embodiments are only some but not all of the embodiments of the disclosure, and based on embodiments of the disclosure, other embodiments obtained by those of ordinary skill in the art without going through any creative work all belong to the scope of protection of the disclosure. The preferred embodiments of the disclosure are shown in the drawings. The drawings are used to supplement the description of the text in the specification with figures, so that people can intuitively and vividly understand each technical feature and the overall technical solution of the disclosure, but the drawings cannot be understood as limiting the scope of protection of the disclosure.

In the description of the disclosure, it should be understood that the orientations or positional relationships indicated by the terms such as "upper", "lower", "front", "rear", "left", "right" and the like, refer to the orientations or positional relationships shown in the drawings, which are only intended to facilitate describing the disclosure and simplifying the description, and do not indicate or imply that the indicated devices or elements must have a specific orientation, be constructed and operated in a specific orientation, and therefore cannot be understood as a limitation of the disclosure.

In the description of the disclosure, "several" refers to being one or more, "multiple" refers to being two or more, and "greater than", "less than", "more than", and the like are understood as not including the following number, while "above", "below", "within", and the like are understood as including the following number. If there is the description of first and second, it is only for the purpose of distinguishing technical features, and should not be understood as indicating or implying relative importance, implicitly indicating the number of the indicated technical features or implicitly indicating the order of the indicated technical features.

In the description of the disclosure, the terms "arrangement", "installation", "connection", and the like should be understood in a broad sense unless otherwise specified and defined. The specific meaning of the above terms in the disclosure may be reasonably determined according to specific contents of the technical solutions by those of ordinary skill in the art. Meanwhile, various technical features in the disclosure may be combined on the premise of not conflicting with each other.

First Embodiment

Figure 2:
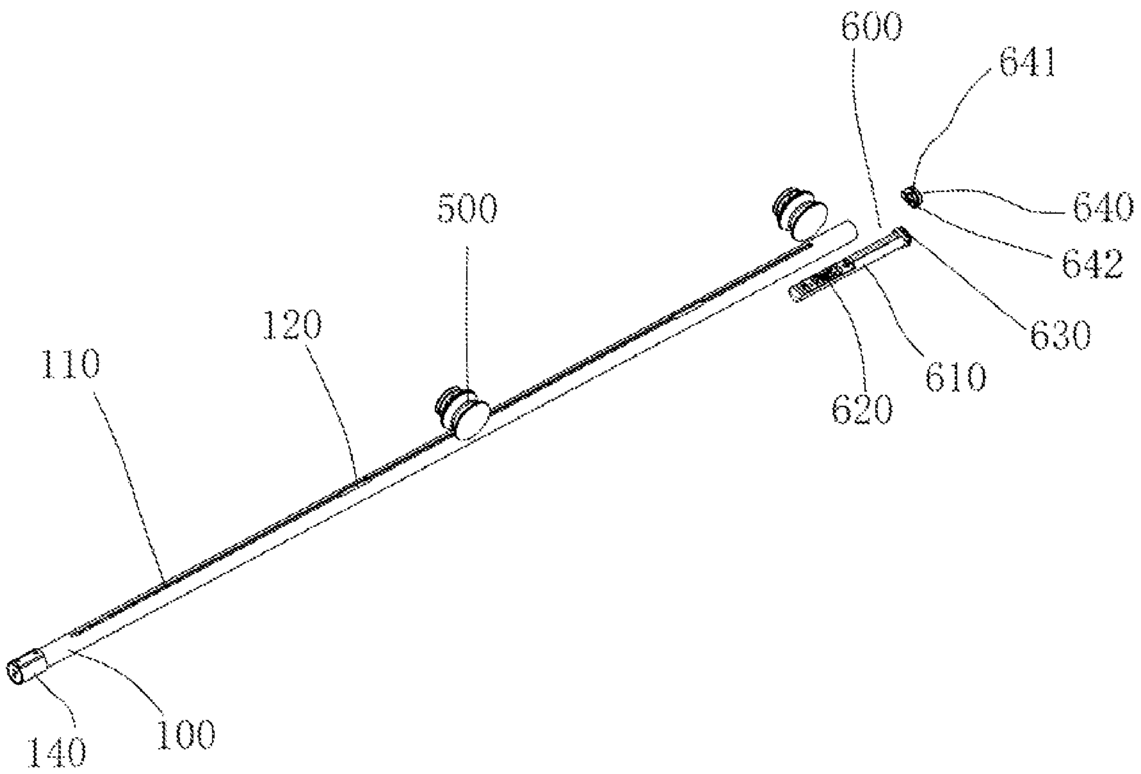
FIG. 2 is a schematic diagram of cooperation between an upper rail and a roller in First Embodiment of the disclosure.
Figure 3:
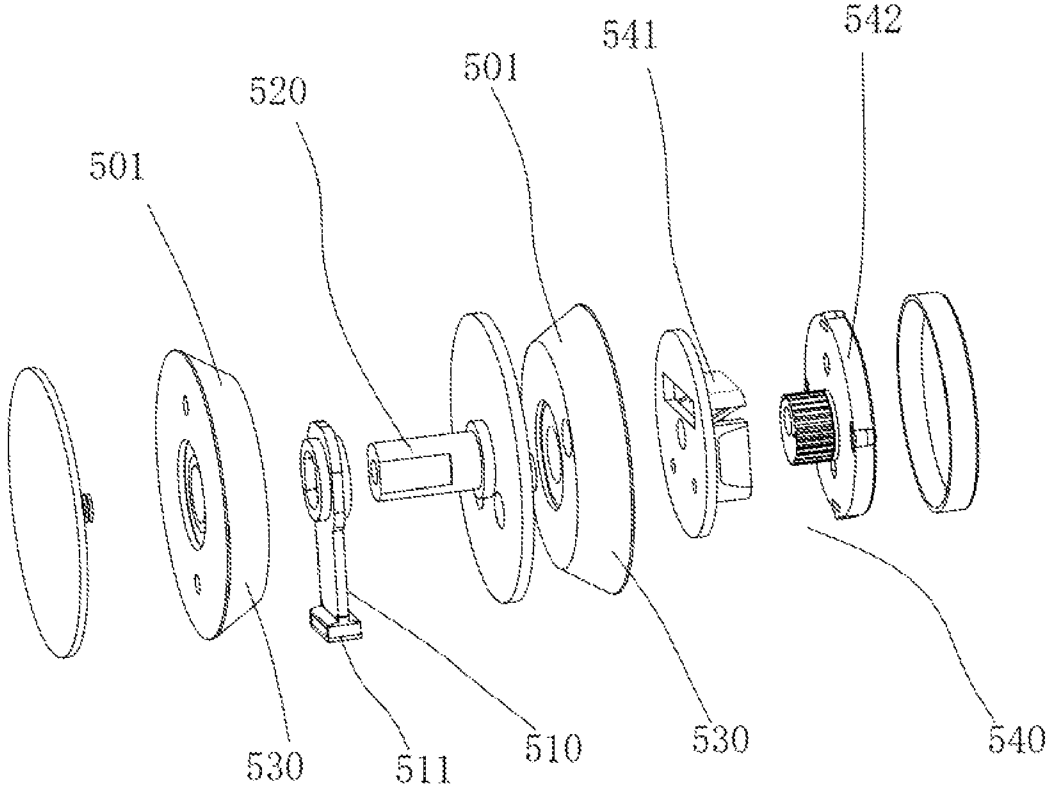
FIG. 3 is an exploded view of the roller in First Embodiment of the disclosure.

With reference to FIG. 1 to FIG. 3, the disclosure provides a shower door with an anti-bounce function. Specifically, the anti-bounce shower door has a column-free mounting structure, which is simple in structure and only comprises an upper rail 100, a lower water stop strip 200, a fixed door 300 and a sliding door 400. The upper rail 100 is fixedly mounted on a wall body directly, the lower water stop strip 200 is directly fixed on the ground, the fixed door 300 is relatively fixedly mounted on the upper rail 100 and the lower water stop strip 200, and the sliding door 400 is slidably connected with the upper rail 100 and the lower water stop strip 200. When the sliding door 400 slides to the left, the fixed door 300 overlaps with the sliding door 400, and the shower door is in an open state at the moment. When the sliding door 400 slides to the right, the sliding door 400 and the fixed door 300 are staggered with each other, and enclose an opening of a shower room, and the shower door is in a closed state at the moment. Because a frameless structure is used, the sliding door 400 is prone to bounce during moving, especially when moving to two ends, the sliding door bounces more obviously due to inertia. To address this issue, in the anti-bounce shower door of the disclosure, by optimizing the upper rail 100 and the rollers mounted on the sliding door 400, the sliding door 400 will not bounce accidentally during moving.

Specifically, with reference to FIG. 2 and FIG. 3, the upper rail 100 is hollow. In an embodiment, the upper rail 100 is a circular tube guide rail made of stainless steel, an upper end surface of the upper rail 100 is provided with a sliding groove 110, and the sliding groove 110 does not extend through the upper rail 100, which means that there is still a certain gap between two ends of the sliding groove 110 and the corresponding end surfaces of the upper rail 100. In the sliding groove 110, two notches 120 are further provided, wherein a width of the sliding groove 110 is a, a width of each of the notches 120 is b, and b>a. In this embodiment, the sliding groove 110 is a constant-width long groove, the notch 120 is also a constant-width short groove, with inclined transitions at the joints between two ends of the notch 120 and the sliding groove 110. Thus, it can be seen that the upper rail 100 may be customized according to an actual situation of a product during production. For example, if the length of the shower door is required to be S, a circular tube is processed to form a blank upper rail with the length of S, and then the sliding groove 110 and the notches 120 are processed by milling.

Figure 4:
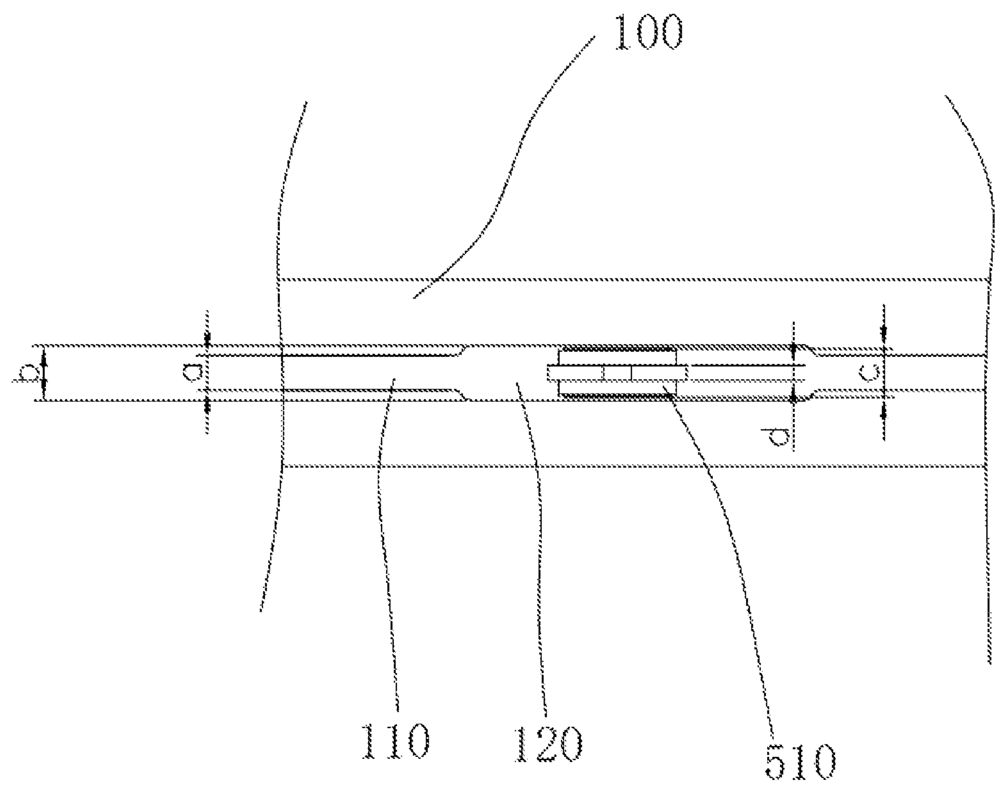
FIG. 4 is a top view of the upper rail in First Embodiment of the disclosure.

With reference to FIG. 4, an upper side of the sliding door 400 is provided with two rollers 500, an anti-bounce hook 510 extending downwardly is arranged in the middle of the roller 500, and a cross section of the anti-bounce hook 510 is T-shaped. Assuming that the maximum outer diameter of the anti-bounce hook 510 is c, the minimum outer diameter of the anti-bounce hook is d, then b>c>a>d. Certainly, the roller 500 further comprises a roller surface 501, and the roller surface 501 abuts against an end surface of the upper rail 100.

During mounting, by aligning the anti-bounce hook 510 with the notch 120, the anti-bounce hook 510 may enter a cavity of the upper rail 100 at the moment, and then the roller surface 501 abuts against the end surface of the upper rail 100. Then, the sliding door 400 slides back and forth, so that the anti-bounce hook 510 deviates from a position of the notch 120. Because a width of the sliding groove 110 is smaller than the maximum outer diameter of the anti-bounce hook 510, when the roller 500 slides, the upper end surface of the anti-bounce hook 510 is blocked by an inner end surface of the sliding groove 110, so that the roller 500 as a whole cannot be separated from the upper rail 100 upwardly. It can be understood that a length of the notch 120 only needs to be slightly larger than a length of the anti-bounce hook 510, and the larger the length of the notch is, the higher the risk of accidental separation of the roller 500 from the upper rail 100 is. Meanwhile, the notch 120 is also arranged to be located in a middle portion of the sliding groove 110, which avoids the notch 120 from being arranged at two ends of the sliding groove 110. As mentioned above, when the sliding door 400 moves to two ends, the risk of bouncing up is higher. Therefore, the arrangement of the notch 120 to be close to the middle portion of the sliding groove 110 can effectively reduce the risk of separation of the roller 500 from the notch 120.

In addition, in order to reduce the collision with the end surface of the upper rail 100 when the sliding door 400 slides to two ends of the upper rail 100, the anti-bounce shower door is further provided with buffers 600 at two ends of an upper end. The buffer 600 is provided with a shell 610, and an outer shape of the shell 610 corresponds to the cavity of the upper rail 100. Meanwhile, the buffer 600 is provided with a clamping hook 620, and the clamping hook 620 corresponds to the anti-bounce hook 510. That is, when the sliding door 400 slides to two sides, the anti-bounce hook 510 can hook the clamping hook 620, and when the sliding door 400 continues to move, the clamping hook 620 may be driven to move. When the clamping hook 620 moves, the buffer 600 may provide a resistance, so that the sliding door 400 can slow down. By optimizing a structure of the buffer 600, the mounting of the anti-bounce shower door is simpler and more compact as a whole, so that the mounting is more convenient.

In addition, as mentioned above, the upper rail 100 may be directly mounted on the wall body. In order to further improve mounting efficiency of the upper rail 100, the anti-bounce shower door completes fixed mounting of the upper rail 100 by using the buffer 600. The buffer 600 is mounted on the end surface of the upper rail 100, and the buffer 600 may be fixedly mounted to the upper rail 100 by a bolt and other structures. In this way, the upper rail 100 can be fixedly mounted to the wall body simply by fixedly mounting the buffer 600 to the wall body. Specifically, an outer end of the shell 610 is provided with an end head 630, the end head 630 is provided with a dovetail groove. An upper rail mounting seat 640 is further comprised, the upper rail mounting seat 640 comprises a mounting hole 641 and an inlay block 642, and the inlay block 642 is connected with the dovetail groove. During mounting, the upper rail mounting seat 640 is fixed on the wall body by an expansion screw first, the expansion screw may pass through the mounting hole 641, then the dovetail groove of the end head 630 is aligned with the inlay block 642, and finally, the upper rail 100 and the buffer 600 are mounted on the upper rail mounting seat 640. It can be understood that the dovetail groove extends along a front-rear direction, which means that when the upper rail 100 is mounted on the upper rail mounting seat 640, the upper rail is mounted along the front-rear direction. Because the mounting structure above is used, a length of the upper rail 100 may be cut according to actual mounting requirements. For example, when the designed product leaves the factory, a length of the upper rail 100 is larger than an actual space size of the shower room, and only two ends of the upper rail 100 need to be partially cut off according to actual requirements at the moment. Therefore, the convenience of on-site mounting is greatly improved.

In order to prevent the upper rail 100 from accidentally falling off after mounting, a mounting sleeve 140 may be arranged around the upper rail 100. After the upper rail 100 is mounted in place, the mounting sleeve 140 is arranged around the upper rail 100 and the upper rail mounting seat 640 at the same time, and fastened by a fastening screw, which can avoid the upper rail 100 from falling off due to an external force after mounting.

With reference to FIG. 3, as a preferred embodiment, the roller 500 comprises a base frame 520, the base frame 520 is provided with two wheels 530, and the wheels 530 are rotatably connected with the base frame 520. The anti-bounce hook 510 is located between the two wheels 530. Meanwhile, the roller 530 comprises an inclined end surface, the inclined end surfaces of the two wheels form a V-shaped wheel surface 501, and the V-shaped wheel surface 501 abuts against the upper rail 100.

Further, as a preferred embodiment, the anti-bounce shower door further comprises a glass mounting assembly 540, wherein the glass mounting assembly 540 is fixedly connected with the base frame 520 through a bolt. The glass mounting assembly 540 comprises a back plate 541 and a fixing plate 542, the back plate 541 is provided with a mounting block, an adjusting cavity is arranged in the mounting block, and one side surface of the adjusting cavity is provided with a clamping tooth. The fixing plate 542 is provided with a mounting column, a mounting hole is arranged in the mounting column, a center line of the mounting hole does not overlap with a center line of the mounting column, and the bolt passes through the mounting hole and then is connected with the base frame. An outer surface of the mounting column is provided with a second clamping tooth, and the second clamping tooth and the clamping tooth abut against each other.

Further, as a preferred embodiment, a bottom portion of the anti-bounce hook 510 is coated with an anti-collision rubber block 511. The use of the anti-collision rubber block can reduce a collision sound between the anti-bounce hook and the upper rail.

Second Embodiment

The anti-bounce principle of this embodiment is basically the same as that of First Embodiment. In this embodiment, the processing of the upper rail 100 is more convenient by optimizing the anti-bounce structure.

Figure 5:
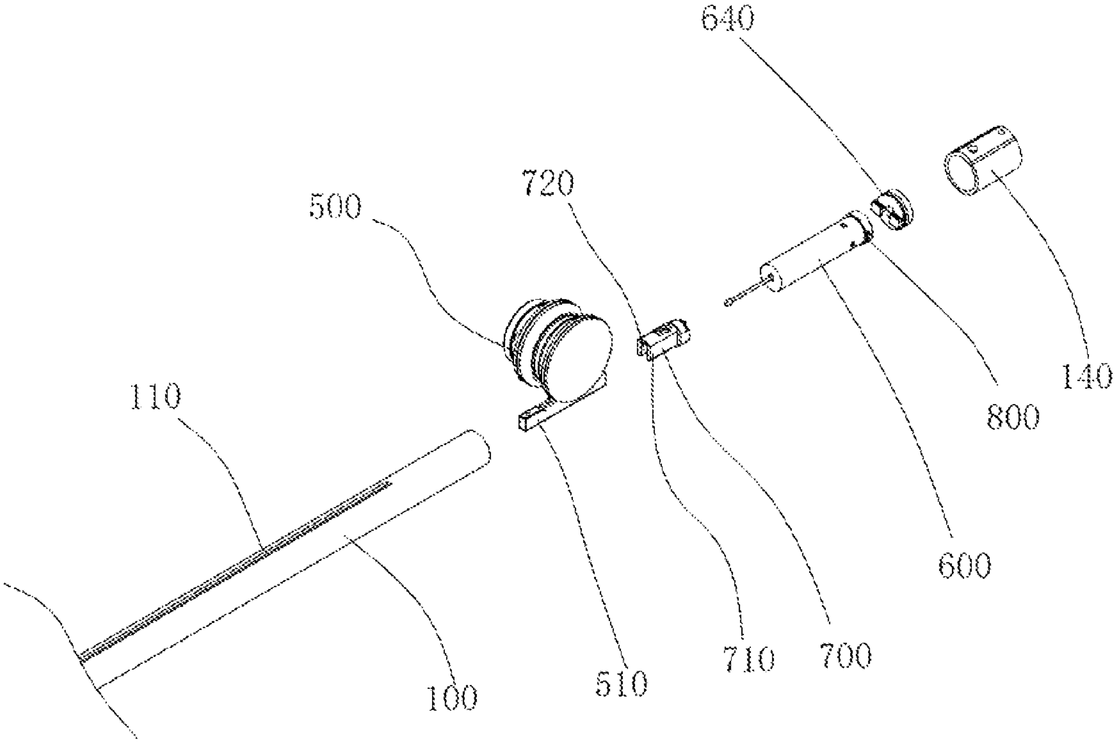
FIG. 5 is an exploded view of Second Embodiment of the disclosure.

With reference to FIG. 5, the slide rail 100 is in a circular tube shape, the middle of the slide rail 100 is hollow, and the middle of the upper rail 100 comprises a cavity extending through the upper rail 100 from left to right. An upper side of the slide rail 100 is provided with a constant-width sliding groove 110, the sliding groove 110 is located in the middle of the upper rail 100, and a length of the sliding groove 110 is smaller than a length of the slide rail 100. During production, the required sliding groove 110 may be processed in the slide rail 100 by a milling machine or a sawing machine.

The anti-bounce hook 510 comprises a straight cross rod, and an anti-bounce member 700 is slidably arranged in the cavity of the slide rail 100. The anti-bounce member 700 comprises a main body 710, an upper end surface of the main body 710 is arc-shaped, and the main body 710 has a square shape as a whole. A hook groove 720 is arranged in the main body 710, the hook groove 720 is open towards a lower end of the main body 710, a width of the hook groove 720 is slightly larger than a thickness of the cross rod, and the thickness of the cross rod is smaller than a groove width of the sliding groove 110. Meanwhile, a thickness of the main body 710 is larger than the groove width of the sliding groove 110. The main body 710 comprises a countersunk hole.

During mounting, the anti-bounce member 700 is placed in the upper rail 100 first.

Then, the sliding door 400, together with the roller 500, are placed on the upper rail 100 from top to bottom. During placing, the cross rod of the anti-bounce hook 510 of the roller 500 is aligned with the sliding groove 110.

Then, the sliding door 400 slides to one side of the upper rail 100, so that the cross rod is inserted into the hook groove 720. After a bump is aligned with a positioning groove, the cross rod and the anti-bounce member 700 are fastened together by a screw through the countersunk hole in the main body 710.

Because an outer diameter of the anti-bounce member 500 is larger than a groove opening of the long groove 110, the cross rod 442 is fixed in the slide rail 110. When the sliding door 200 bounces, the anti-bounce member 500 abuts against the slide rail 100, thus playing an anti-bounce role. Moreover, because the anti-bounce member 500 is hidden in the upper rail, the anti-bounce structure cannot be seen from the outside.

When in use, because the roller 500 and the anti-bounce member 700 are connected into a whole by a screw, when the sliding door 400 slides to an end portion of the upper rail 100, an end portion of the anti-bounce member 700 may abut against a thimble of a buffer unit first, and the thimble is forced to retreat backwardly. A moving speed of the sliding door 400 is forced to be reduced by an acting force of the buffer unit. When the sliding door 400 moves to a tail end of a stroke, two magnetic members are close to each other, and an attractive force is generated between the two magnetic members. The sliding door 400 may be relatively fixed by the attractive force. However, when the sliding door 400 needs to be pushed, the sliding door 400 may be driven to slide by pushing the sliding door 400 with a force to overcome the attractive force between the two magnetic members. When the anti-bounce member 700 is far away from the buffer 600, the thimble of the buffer 600 is reset under an action of an elastic force of the thimble to wait for the next work.

Further, as a preferred embodiment, in order to make the sliding door 400 play a certain limiting role when sliding in place, a magnetic assembly is added in an embodiment. Specifically, one side of the anti-bounce member 700 close to the buffer 600 is provided with a first magnetic member 800, such as a magnet or an iron block. In order to facilitate the placement of the first magnetic member 800, one side of the anti-bounce member 700 is provided with a mounting groove, and the first magnetic member 800 is clamped in the mounting groove. Then, a second magnetic member, such as a magnet or an iron block, is added in the shell 610 of the buffer 600. Certainly, because the buffer unit comprises the thimble, the second magnetic member should comprise a circular hole for the thimble to extend through.

The foregoing describes the preferred embodiments of the disclosure in detail, but the disclosure is not limited to the embodiments. Those of ordinary skill in the art may further make various equivalent modifications or substitutions without violating the gist of the disclosure, and these equivalent modifications or substitutions are all included in the scope defined by the claims of the disclosure.

What is claimed is:

1. An anti-bounce shower door, comprising an upper rail and a sliding door, the sliding door being provided with a roller, and the roller being slidably connected with the upper rail, wherein the upper rail is hollow, an upper side of the upper rail is provided with a sliding groove, the sliding groove extends along a length direction of the upper rail, the roller is provided with an anti-bounce hook, the anti-bounce hook extends into the sliding groove, and the anti-bounce hook abuts against at least a part of the sliding groove; and wherein the sliding groove is provided with a notch, and an outer diameter of the notch is larger than a width of a groove opening of the sliding groove; a cross section of the anti-bounce hook is T-shaped, and a maximum outer diameter of the anti-bounce hook is larger than the width of the groove opening of the sliding groove and smaller than the outer diameter of the notch.

2. The anti-bounce shower door according to claim 1, wherein an outer diameter of the anti-bounce hook is smaller than a groove width of the sliding groove, an anti-bounce member is movably arranged in the upper rail, an outer diameter of the anti-bounce member is larger than the groove width of the sliding groove, and the anti-bounce hook is detachably connected with the anti-bounce member.

3. The anti-bounce shower door according to claim 1, wherein one side of the upper rail is provided with a buffer, the buffer comprises a clamping hook, and the clamping hook corresponds to the anti-bounce hook.

4. The anti-bounce shower door according to claim 3, wherein the buffer is detachably connected with the upper rail, the buffer comprises a shell, and the shell abuts against an inner wall of the upper rail.

5. The anti-bounce shower door according to claim 4, wherein an outer end of the shell is provided with an end head, the end head is provided with a dovetail groove, and an upper rail mounting seat is further comprised, the upper rail mounting seat comprises a mounting hole and an inlay block, and the inlay block is connected with the dovetail groove.

6. The anti-bounce shower door according to claim 1, wherein the roller comprises a base frame, the base frame is provided with two wheels, and the wheels are rotatably connected with the base frame; and the anti-bounce hook is located between the two wheels.

7. The anti-bounce shower door according to claim 6, wherein each of the wheels comprises an inclined end surface, the inclined end surfaces of the two wheels form a V-shaped wheel surface, and the V-shaped wheel surface abuts against the upper rail.

8. The anti-bounce shower door according to claim 6, further comprising a glass mounting assembly, wherein the glass mounting assembly is fixedly connected with the base frame through a bolt.

9. The anti-bounce shower door according to claim 8, wherein the glass mounting assembly comprises a back plate and a fixing plate, the back plate is provided with a mounting block, an adjusting cavity is arranged in the mounting block, and one side surface of the adjusting cavity is provided with a clamping tooth; the fixing plate is provided with a mounting column, a mounting hole is arranged in the mounting column, a center line of the mounting hole does not overlap with a center line of the mounting column, and the bolt passes through the mounting hole and then is connected with the base frame; and an outer surface of the mounting column is provided with a second clamping tooth, and the second clamping tooth and the clamping tooth abut against each other.

* * * * *